(12) United States Patent
Boivie

(10) Patent No.: US 6,577,418 B1
(45) Date of Patent: Jun. 10, 2003

(54) OPTICAL INTERNET PROTOCOL SWITCH AND METHOD THEREFOR

(75) Inventor: Richard Harold Boivie, Monroe, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/433,239

(22) Filed: Nov. 4, 1999

(51) Int. Cl.$^7$ .................................................. H04J 14/02
(52) U.S. Cl. ...................................................... 359/128
(58) Field of Search .............................. 359/128, 124; 370/351, 254

(56) References Cited

U.S. PATENT DOCUMENTS

| | | | | |
|---|---|---|---|---|
| 5,550,818 A | * | 8/1996 | Brackett et al. | 359/123 |
| 5,937,115 A | * | 8/1999 | Domash | 359/130 |
| 6,097,859 A | * | 8/2000 | Solgaard et al. | 385/17 |
| 6,111,673 A | * | 8/2000 | Chang et al. | 359/123 |

OTHER PUBLICATIONS

M. Garnot et al., "Planning of WDM Networks: Methods, Routing Node Modeling and Applications", IEEE, 1998.*
S. Xu et al., "Dynamic Routing and Assignment of Wavelength Algorithms in Multi–Fiber Wavelength Division Multiplexing Networks", Proceedings of Eight International Conference on Computer Communications and Networks, Oct. 1999.*
C. Brackett, "Dense Division Multiplexing Networks: Principles and Applications", IEEE Journal on Selected Areas in Communications, vol. 8, No. 6, Aug. 1990.*
J. Crowcroft, "IP over Photons: How not to waste the waist of the Hourglass", 1999 Seventh International Workshop on Quality of Service, May 31–Jun. 4, 1999.*
"High–speed Networks: TCP/IP and ATM Design Principles" by W. Stallings, Prentice–Hall, 1998, p. 414–421.*
Mignardi, M., "Froms ICs to DMD™s", TI Technical Journal, Jul.–Sep. 1998, pp. 56–63.
Liaw, et al., "Multichannel add/drop and cross–connect using fibre Bragg gratings and optical switches", Electronics Letters, Aug. 6, 1998, vol. 34, No. 16, pp. 1601–1603.
Toshiyoshi, et al., "Electrostatic Micro Torsion Mirrors for an Optical Switch Matrix", Journal of Microelectromechanical Systems, vol. , No. 4, Dec. 1996, pp. 231–237.
Lin, et al., "Free–Space Micromachined Optical Switches with Submillisecond Switching Time for Large–Scale Optical Crossconnects", IEEE Photonics Technology Letters, vol. 10, No. 4, Apr. 1998, pp. 525–527.

* cited by examiner

Primary Examiner—Leslie Pascal
Assistant Examiner—Shi Ki Li
(74) Attorney, Agent, or Firm—Manny W. Schecter, Esq.; McGinn & Gibb, PLLC

(57) ABSTRACT

An optical switch for a network having a plurality of nodes, includes a switch coupled to communications links used for input and output in which a plurality of wavelengths are used to carry traffic on a communications link, and a controller, coupled to the switch, for controlling the operation of the switch by implementing a routing protocol, and implementing a labeling protocol to associate a wavelength with a route table destination. The controller controls the switch to direct the various wavelengths of traffic from an input link to an appropriate output link as determined by the routing protocol and the labeling protocol.

39 Claims, 5 Drawing Sheets

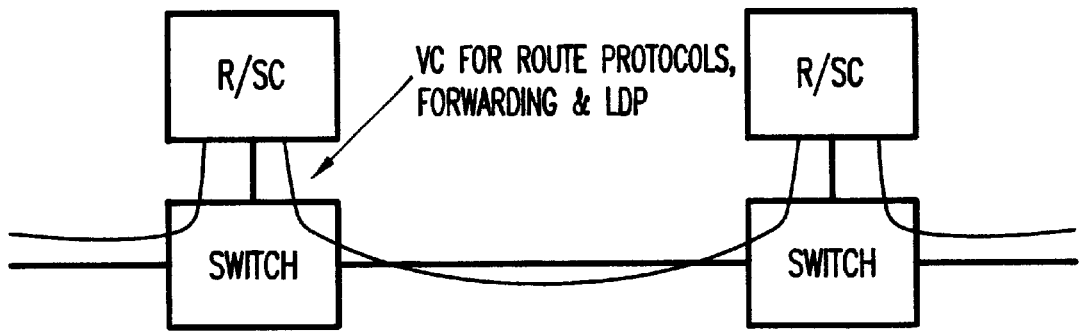
FIG.1 PRIOR ART
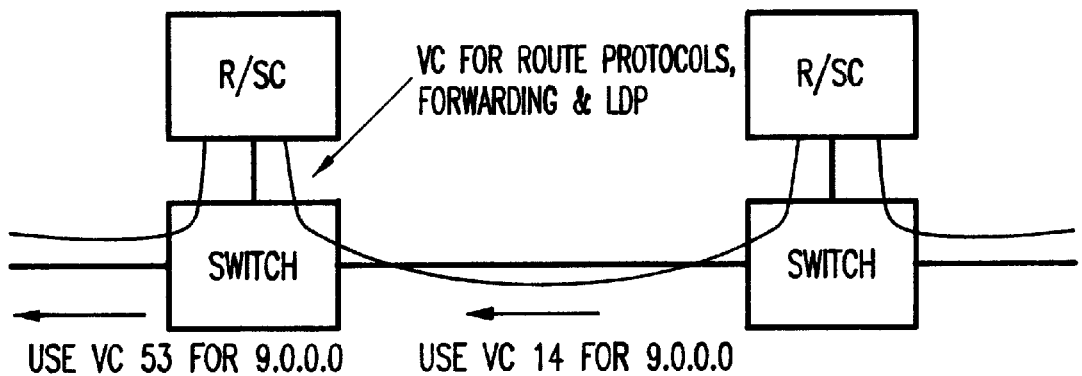
FIG.2 PRIOR ART

OPTICAL INTERNET PROTOCOL SWITCH AND METHOD THEREFOR

BACKGROUND OF THE INVENTION

1. Field of the Invention

The present invention relates to communications, and more particularly to an optical Internet Protocol (IP) switch which combines Multiprotocol Label Switching (MPLS) with optical switch technology in an innovative design that allows the Optical IP Switch to switch traffic in an IP network without processing the individual IP packets in "electronics".

2. Description of the Related Art

The 1990s have been a time of explosive growth for the Internet and by all estimates traffic on the Internet will continue to grow rapidly for some years to come. The U.S. Department of Commerce Department indicates that traffic on the Internet is doubling every 100 days and it is predicted that this doubling of traffic every 100 days will continue at least through the year 2003. It is noted that this high growth is not a recent development, but has been a long-term trend. Indeed, traffic on the NSFnet (which was the backbone of the Internet between 1988 to 1995) increased by a factor of 10 in the first year of operation (e.g., from approximately 100 million packets per month in June, 1988 to about 1.05 billion packets per month in June 1989).

This exponential growth will, if current trends continue, make it difficult for silicon-based routers and switches, currently prevalent in the Internet pathways, to keep up with the traffic. (In the context of the present application, a "router" is a device in a packet-switched network that forwards data packets from an input link to an output link in the direction of the ultimate destination.) It is noted that Moore's law says that silicon processing power doubles in approximately 18 months but Internet traffic doubles in a little over 3 months (e.g., 100 days). (It is noted that the optical fiber will not present a problem for some time, since it is believed that there is 75,000 GHz of useful capacity in a single strand of optical fiber.)

Thus, there will be a severe bottleneck caused by such over-extended silicon-based routers and switches.

SUMMARY OF THE INVENTION

In view of the foregoing problems, drawbacks and disadvantages of the conventional systems and methods, an object of the present invention is to provide a system and method for eliminating much of the processing of the data on the path through a router.

Another object is to eliminate all of the electronics (or at the very least significantly reduce the electronics) on the data path so that an "electronic bottleneck" is avoided and the capacity of the optical fiber can be advantageously exploited.

In a first aspect, an optical switch for a network having a plurality of nodes, includes a switch coupled to communications links used for input and output in which a plurality of wavelengths are used to carry traffic on a communications link, and a controller, coupled to the switch, for controlling the operation of the switch by implementing a routing protocol and implementing a labeling protocol to associate a wavelength with a route table destination. The controller controls the switch to direct the various wavelengths of traffic from an input link to an appropriate output link as determined by the routing protocol and the labeling protocol.

In a second aspect, an optical switch for a network having a plurality of nodes, includes a switch coupled to communications links, which the switch can use for input or output, on the communications links a plurality of wavelengths existing representing traffic thereon, and a controller coupled to the switch for controlling an operation of the switch by implementing a routing protocol and exchanging routing information with other nodes, implementing a network protocol and forwarding the traffic to a next hop, and implementing a labeling protocol to associate a wavelength with a route table destination. The controller controls the switch to connect the various wavelengths of traffic on an input link to an appropriate output link.

Further, the invention provides a network incorporating the inventive switch, a method of communicating, and a signal-bearing medium storing the inventive method.

Thus, the present invention provides an optical Internet Protocol (IP) switch which combines Multiprotocol Label Switching (MPLS) with optical switch technology in an innovative design that allows the Optical IP Switch to switch traffic in an IP network without processing the individual IP packets in "electronics".

By eliminating the electronics from the data path through the switch, the Optical IP Switch can handle very high traffic volumes. This is likely to become important in the future since Internet traffic is expected to continue grow at a high rate for the foreseeable future.

BRIEF DESCRIPTION OF THE DRAWINGS

The foregoing and other purposes, aspects and advantages will be better understood from the following detailed description of preferred embodiments of the invention with reference to the drawings, in which:

FIG. 1 is a block diagram showing a pair of adjacent label switch routers (LSRs) in a conventional arrangement;

FIG. 2 is a block diagram showing a conventional pair of adjacent label switch routers in a network;

DETAILED DESCRIPTION OF THE PREFERRED EMBODIMENTS OF THE PRESENT INVENTION

Figure 3:
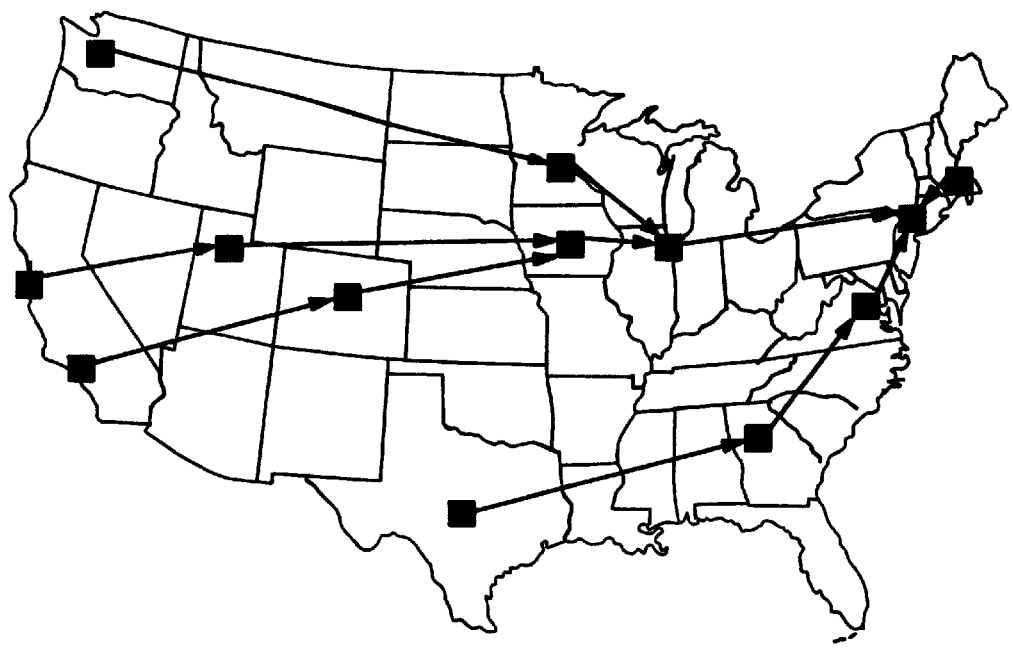
FIG. 3 illustrates a network of conventional ordinary routers in which the routes for a given destination form a tree.
Figure 4:
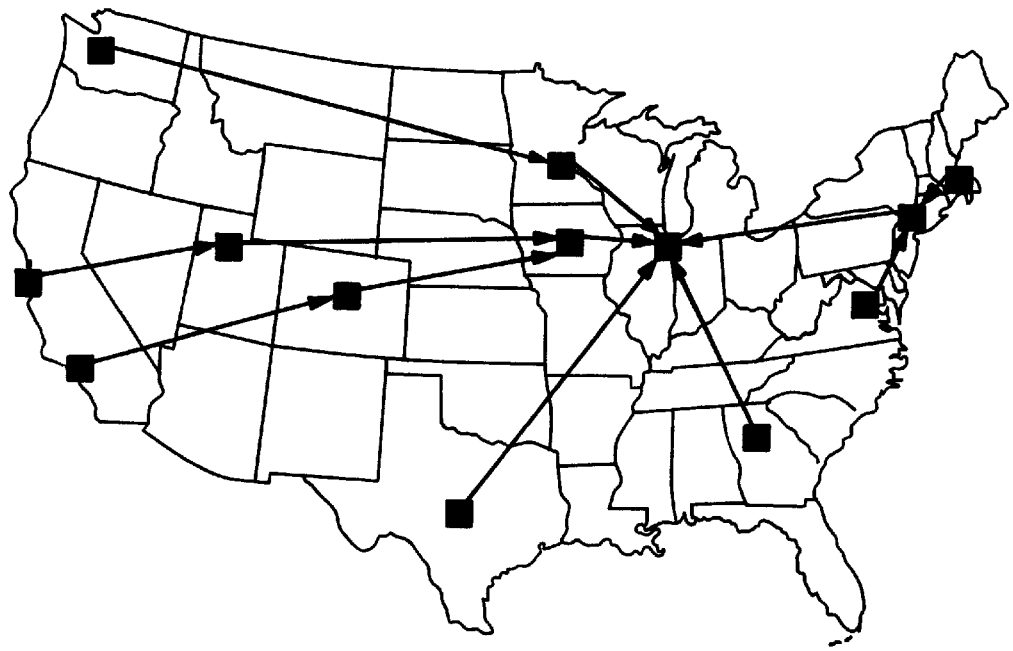
FIG. 4 illustrates a network of routers including the optical IP switch according to the present invention in which the routes for a given destination form a switched path tree.

Referring now to the drawings, and more particularly to FIGS. 1–11, there are shown preferred embodiments of the method and structures according to the present invention.

A solution to the above-described "electronic bottleneck" is to eliminate the electronics from the data path through the router. The inventive optical (IP) switch described hereinbelow eliminates this "electronic bottleneck" through a combination of Multiprotocol Label Switching (MPLS) and optical switching techniques.

Multiprotocol Label Switching (MPLS) is an Internet Engineering Task Force (IETF) effort that combines "label swapping"-based forwarding (e.g. the label swapping used in asynchronous transfer mode (ATM) switches) (see U. Black, ATM: Foundation for Broadband Networks, (Prentice Hall 1995) and H. Dutton et al., Asynchronous Transfer Mode (ATM) Technical Overview, (Prentice Hall 1995)) with network layer routing (see http://www.ietf.org/html.charters/mpls-charter.html). MPLS was developed to remove most (or preferably all) the software off of the data path by using "labels". That is, MPLS improves the performance of a router by eliminating the IP processing (e.g., performed in software) on the data path through the router. This process is described in detail in *IBM Technical Report*, Aggregate Route-based IP Switching (ARIS), N. Feldman et al., TR 29.2343, February 1998), incorporated herein by reference. Essentially, this process attempts to establish switched paths through a network that correspond to the paths computed by the routing protocols so that IP processing can be avoided on most of the routers on the paths through the network.

Thus, MPLS combines a high speed connection-oriented switch (e.g., an ATM Switch) with software, to produce a high-speed IP switch, which uses label switching based on level 3 information (e.g., IP routing information).

FIGS. 1–2 provide a simplified, exemplary illustration of the MPLS process.

FIG. 1 shows an MPLS node and specifically a pair of adjacent "Label Switch Routers" (LSRs). It is noted that "adjacent" in the context of the present invention is not used in the pure geographical sense, but in a logical sense. That is, two adjacent system may be miles apart but would be deemed to be "adjacent" to each other if they are directly interconnected.

A "Label Switch Router" (LSR) includes a label swapping switch (e.g., such as an ATM switch) and a "Router/Switch Controller". The Router/Switch Controller (RSC) exchanges IP routing information with other routers (e.g., some of which may be "Label Switch Routers") via the standard routing protocols (e.g., open shortest path first (OSPF), Border Gateway Protocol (BGP) etc.) and forwards IP packets based upon the routing information that it acquires. The RSC also controls its associated label swapping switch and sets up switched connections through the switch. The purpose of these switched connections and the mechanisms for setting up these switched connections are described below.

The links (e.g., communication lines between nodes; one hop between adjacent nodes) between the adjacent LSRs in FIG. 1 are ATM links, and the traffic on these links is carried in ATM cells.

An ATM cell contains an ATM header which contains some information that "labels" the cell as belonging to a particular "virtual circuit" (or VC) (e.g., the label is "local" to a given link). ATM switches use this label information in deciding how a cell should be routed (e.g., see U. Black, ATM: Foundation for Broadband Networks, (Prentice Hall 1995) and H. Dutton et al., Asynchronous Transfer Mode (ATM) Technical Overview, (Prentice Hall 1995) for a more detailed description of the ATM architecture.) Since the labels are "small" integers (e.g. between 0 and 4096), the routing can be done in hardware at high-speed.

In an MPLS network, one of the VCs (e.g., the "default VC") is used for exchanging routing information and for forwarding IP datagrams between adjacent LSRs, as shown in FIG. 1. LSRs also use this default VC for a Label Distribution Protocol (LDP) which is used to associate labels (e.g., VCs) with route table entries.

For example, FIG. 2 shows nodes which are formed by a switch and a router/switch controller. The nodes use IP routing protocols and an LDP to set up switched paths. In FIG. 2, each of the LSRs uses the LDP to inform a neighbor of the association that it would like to establish between a VC and a route table entry (e.g., in this case network 9.0.0.0.)

If an LSR detects that it has received an IP datagram on the default VC, the switch will route the individual cells to the RSC where they will be assembled and processed. The processing on the RSC includes the conventional IP header level processing that routers typically perform including checking the IP header checksum, processing any IP options, decrementing the value of the time-to-live (TTL) field in the IP header (and discarding the packet if the resulting value of the TTL field is 0), recomputing the header checksum, determining the next hop in the IP forwarding table, dividing the IP datagram into ATM cells and sending those cells out on the appropriate link.

On the other hand, much of this processing can be avoided if adjacent LSRs have established appropriate mappings between VCs and route table entries. For example, if adjacent LSRs have agreed on the mappings shown in FIG. 2 and if the right-hand LSR in FIG. 2 is the "next hop" router for the lefthand LSR for traffic going to network 9.0.0.0, then the RSC in the lefthand LSR can instruct its switch to "splice" VC 53 from its lefthand link to VC 14 on its right-hand link.

As a result, any traffic that arrives on VC 53 (e.g., traffic addressed to network 9.0.0.0) will go out on VC 14 without any of the RSC processing described above. Obviously, in a real world (practical) network, this splicing would be done for most or all of the destinations in the route table. The present inventors have also provided for using a single VC for all of the destinations that are "behind" a given "egress" point, as described in *IBM Technical Report*, Aggregate Router-based IP Switching (ARIS), N. Feldman et al., TR 29.2343, February 1998). This offloads the LSRs "in the middle" of a network which makes it easier for the nodes in the middle to handle the aggregated traffic of all the "edges" of the network. From the early days of the NSFnet, it has been a challenge making the "middle of the network" run fast enough to handle the traffic from all of the edges. However, by offloading the "middle", MPLS helps the middle keep up with the edges even as the edges are running faster and faster.

As described above, MPLS can be used to eliminate much of the processing on the data path through a router. Such a concept may be extended with the present invention to eliminate substantially all of the "electronics" on the data path such that the "electronic bottleneck" can be avoided, and the enormous capacity of optical fiber can be exploited.

The inventive optical IP switch discussed hereinbelow has some similarities with the LSR described above but with several key differences. Like the LSR, the Optical IP Switch includes a switch and an RSC.

Further, like the RSC in the LSR, the RSC in the Optical IP Switch implements routing protocols and exchanges routing information with other nodes, implements the IP protocol and forwards IP datagrams to next hops, implements an LDP to associate "labels" with route table destinations, and controls a switch to connect an input "VC" to an output "VC".

However, in contrast to the LSR which uses ATM VCs, the Optical IP Switch uses wavelengths (e.g., different destinations in the route table will be associated with different "colors" (wavelengths)) of light.

Further, unlike the LSR which uses an ATM switch and label swapping to splice an input VC to an output VC, the Optical IP Switch uses optical technology to route the different wavelengths in different directions.

The Optical IP Switch also differs from the LSR in that, when the LSR splices an input VC to an output VC, the two VCs can be different as in the example above in which the LSR splices VC 53 to VC 14. However, when the Optical IP Switch splices an input "VC" to an output "VC", it will use the same wavelength for both "VC"s. This simplifies the design of the optical switch since it eliminates the need for wavelength conversion but it does limit flexibility in assigning "VC"s. However, as described below, this is not a serious problem.

In a network of Optical IP Switches (or OIPs), the OIPs will run routing protocols, exchange routing information and determine the next hop for various destinations, similarly to other (e.g., conventional) routers. Further, as in a network of conventional routers, the routes for a given destination will form a tree similarly to the one shown in FIG. 3. That is, for each egress point, a tree is built.

However, in the present invention, in a network of inventive OIPs, the OIPs will also use an LDP to establish switched paths to each "egress" where an egress is the point at which traffic leaves a network of OIPs. The switched paths to an egress will be used for all the destinations that are "behind" that egress. For purposes of the present invention a destination is "behind" an egress if traffic has to pass through the egress to reach the destination.

The switched paths will be established as follows. From each egress, the OIPs will grow a switched path tree that is rooted at the egress. The tree will grow upwards from the root to the leaves as described in *IBM Technical Report*, Aggregate Route-based IP Switching (ARIS), N. Feldman et al., TR 29.2343, February 1998), incorporated herein by reference.

A given tree will use a single wavelength that is passed upwards from the root as branches are added to the tree. For example, the tree shown in FIG. 3, which delivers traffic to Westchester County, New York might use a "blue" wavelength. The tree in FIG. 4, which delivers traffic to the Chicago area, might use a "red" wavelength. Because a tree grows upwards from the root, assigning a single wavelength to all of the branches in a given tree is a simple matter.

"Merging" is also an issue in setting up switched path trees (e.g., see *IBM Technical Report*, Aggregate Route-based IP Switching (ARIS), N. Feldman et al., TR 29.2343, February 1998). That is, at a merge point, like the one in Iowa in the switched path trees shown in FIGS. 3 and 4, care must be taken so that merging traffic does not result in garbled data. In an MPLS-over-ATM network, special hardware is used in ATM switches to avoid what is called the "cell interleaving problem" in which cells from different packets become interleaved at a merge point. Such a problem does not result in the unique and unobvious configuration of the present invention.

That is, the merging problem has been addressed in a network of Optical IP Switches in several unique ways. One solution is to use different "shades" of color at a merge point. For example, the transmission from Salt Lake City to Ames, Iowa in FIG. 4 might use a "light blue" wavelength and the transmission from Denver to Ames, Iowa might use a "dark blue" wavelength.

Another possibility is to use multi-fiber bundles on the links between OIPs and then arrange things so that, for example, the "blue" wavelengths from different sources are carried on different fibers in a bundle. Both of these techniques are described in the examples below.

Figure 5A:
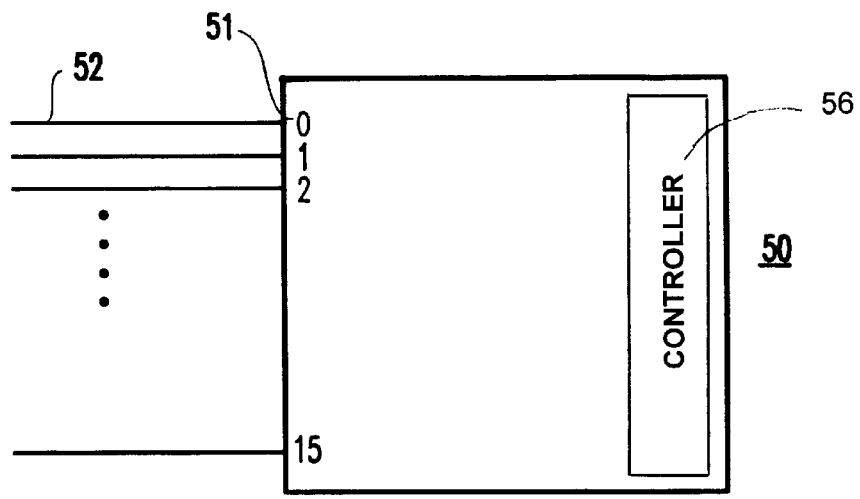
FIGS. 5A–5B illustrate a simplified optical IP switch according to the present invention.

FIG. 5A illustrates a simplified optical IP switch 50 according to the present invention. The switch 50 includes a controller 56 and connects to a plurality (e.g., 16) optical ports 51 and each port connects to two "bundles" of optical fibers 52. It is noted that, instead of connection to 16 ports, the invention could easily connect to 8 ports or 32 ports or k ports for any reasonable value of k (e.g., $k \leq 100$).

Figure 5B:
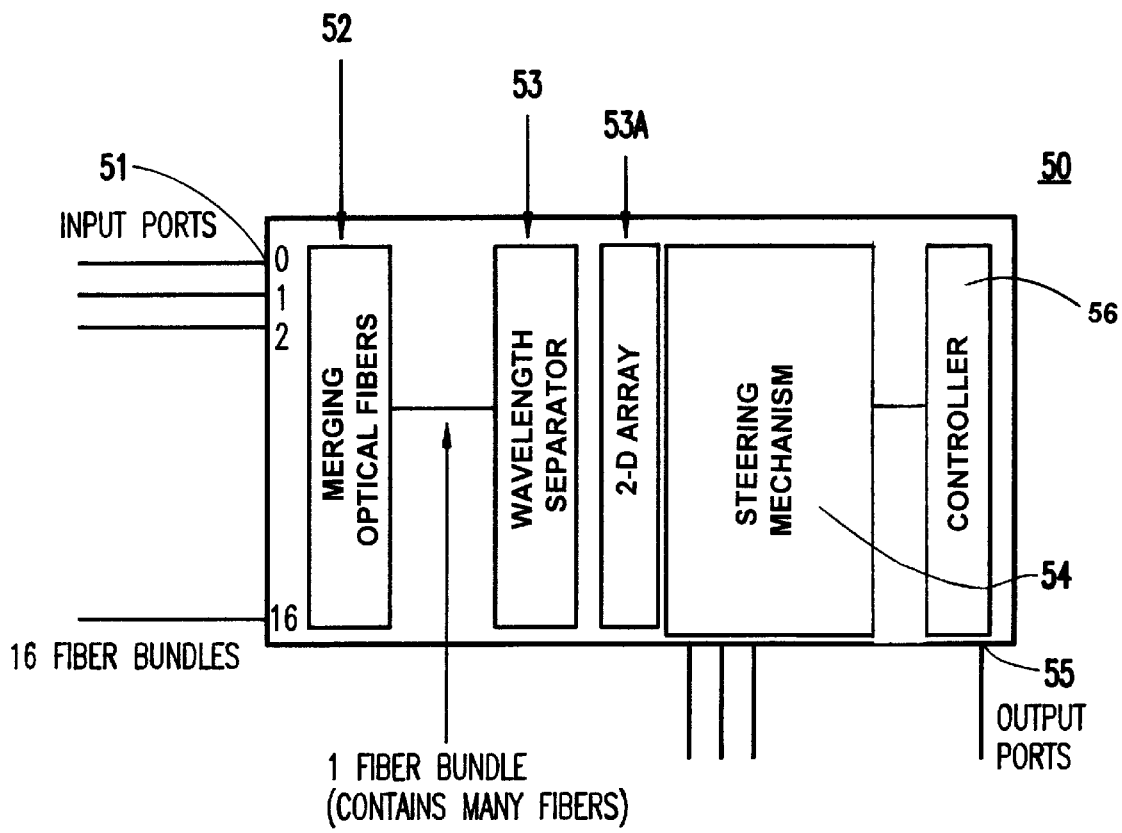

A port receives traffic on one of these fiber bundles and transmits on the other. Each fiber bundle contains a plurality (e.g., 100) hair-thin optical fibers and each fiber can carry up to 100 wavelengths of light. This exemplary choice of 100 fibers in a bundle and 100 wavelengths in a fiber allows building a high-speed backbone network of up to 100 nodes. It is noted that k fibers in a bundle and k wavelengths on a fiber could be used to support networks of up to k nodes. Referring to FIG. 5B, a schematic block diagram of the optical IP switch is shown. As shown, the optical switch includes the input ports 51 as described above coupled to optical fibers 52 which are merged together.

Further, the optical switch includes a wavelength separator 53 for dividing the light beams received into a two-dimensional array 53A formed by the fiber number and the wavelength (color), as described further below.

Further, a light beam steering mechanism 54 (e.g., rotatable mirror or fixed LC coupled to a voltage source) for "steering" the light beams to the appropriate output port 55, and thus for performing a splicing operation between two VCs in the circuit.

In a network of these switches, a wavelength will be associated with each egress (e.g., "blue" light for traffic going to Westchester and "red" light for traffic going to Chicago). Further, a particular fiber number will be associated with each "ingress". It is noted that in ARIS and MPLS, a traffic "source" is also known as an "ingress". An "egress" is also known as a traffic "sink". Thus, a fiber i in a bundle of fibers will be used for traffic that enters the network at node i.

Since nodes in real world networks can be sinks as well as sources, the invention also assigns a unique number between 0 and 99 to each node and the i-th color will be used for traffic that leaves the network at node i and the i-th fiber for traffic that enters the network at node i.

The internal details of the optical switch according to the present invention are shown in FIGS. 6–9.

Figure 6:
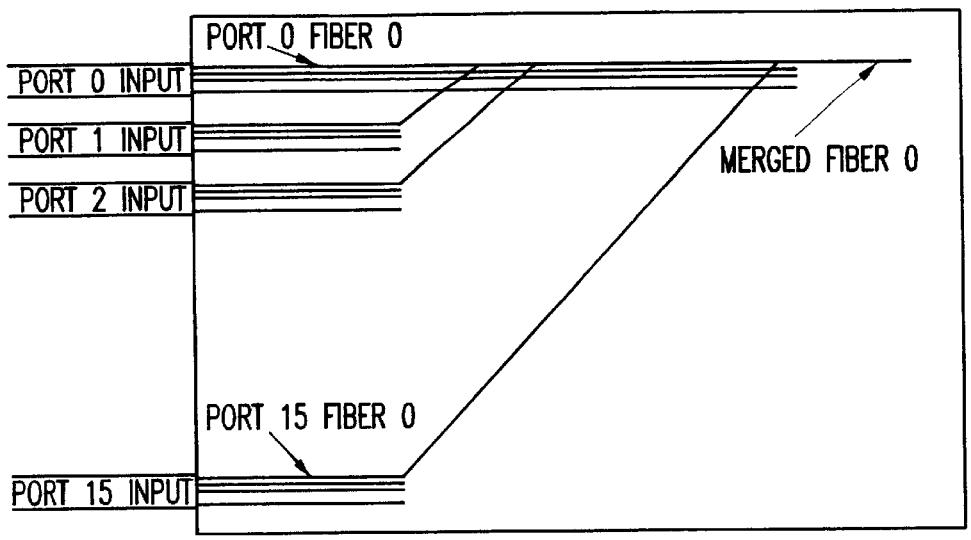
FIG. 6 illustrates the merging of the input ports of the Optical IP switch of FIGS. 5A–5B.

First, the fiber bundles from the 16 input ports are "merged together", as shown in FIG. 6. That is, fiber-0 from each of the 16 input ports are merged such that light from any of the 16 fiber-0s is passed on to a single "merged" fiber-0. Similarly, fiber-1 from each of the 16 inputs are merged together, and so on for each of the fibers between 0 and 99.

This merging reduces, by a factor of 16, the number of fibers that must be dealt with in the remaining "stages" of the switch. It is noted that this merging will not result in any "garbling" problems as long as the routing protocol computes a single route between any two points.

That is, since fiber i, for example, is only used for traffic originating at node i and since node i's traffic will be arriving at any node j on a single port, no merging problems will occur on fiber i, for any value of i.

After this first stage of processing, a single 100-fiber bundle can be dealt with.

Figure 7:
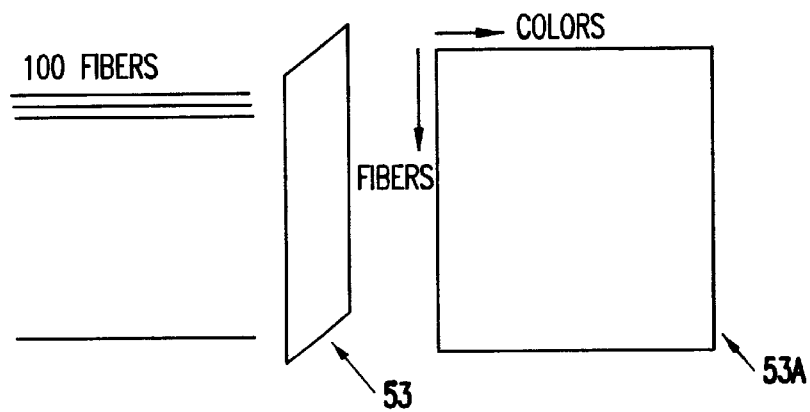
FIG. 7 illustrates a fiber bundle, wavelength separator and a 2-dimensional array of light beams produced by the optical IP switch according to the present invention.

The next step is to separate the wavelengths in the 100 fibers. The wavelength separator 53 (e.g. a prism, a diffraction grating, etc.), as shown in FIG. 5B, is used to separate the wavelengths in each of the fibers. This results in a 2-dimensional array 53A of light beams in which one dimension corresponds to color and the other dimension corresponds to fiber number, as shown in FIG. 7.

Since, as mentioned above, the i-th color is used for traffic that leaves the network at node i, it is desired to direct all of the light beams of color i out the appropriate output port so that they can get to node i.

Figure 8:
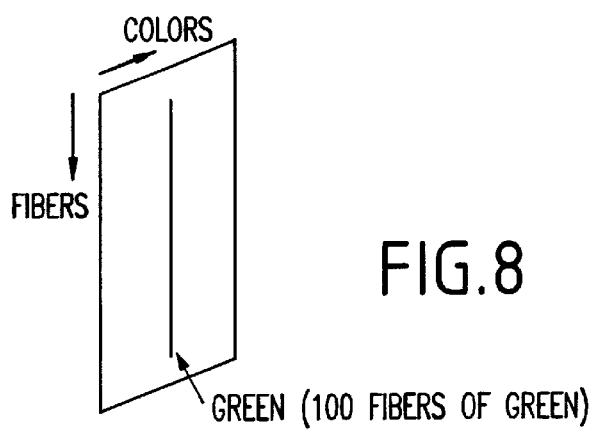
FIG. 8 illustrates another view of the 2-dimensional light beam array of FIG. 7.

FIG. 8 provides another view of the 2-dimensional array of light beams.

Since a color, such as "green", corresponds to a given egress and since all the green light beams are neatly arranged in a column, the light steering mechanism 54 (e.g., a mirror, reflective member, liquid crystal, etc.), as shown in FIG. 5B, can be used to steer the column of green light beams to the appropriate output port.

Figure 9:
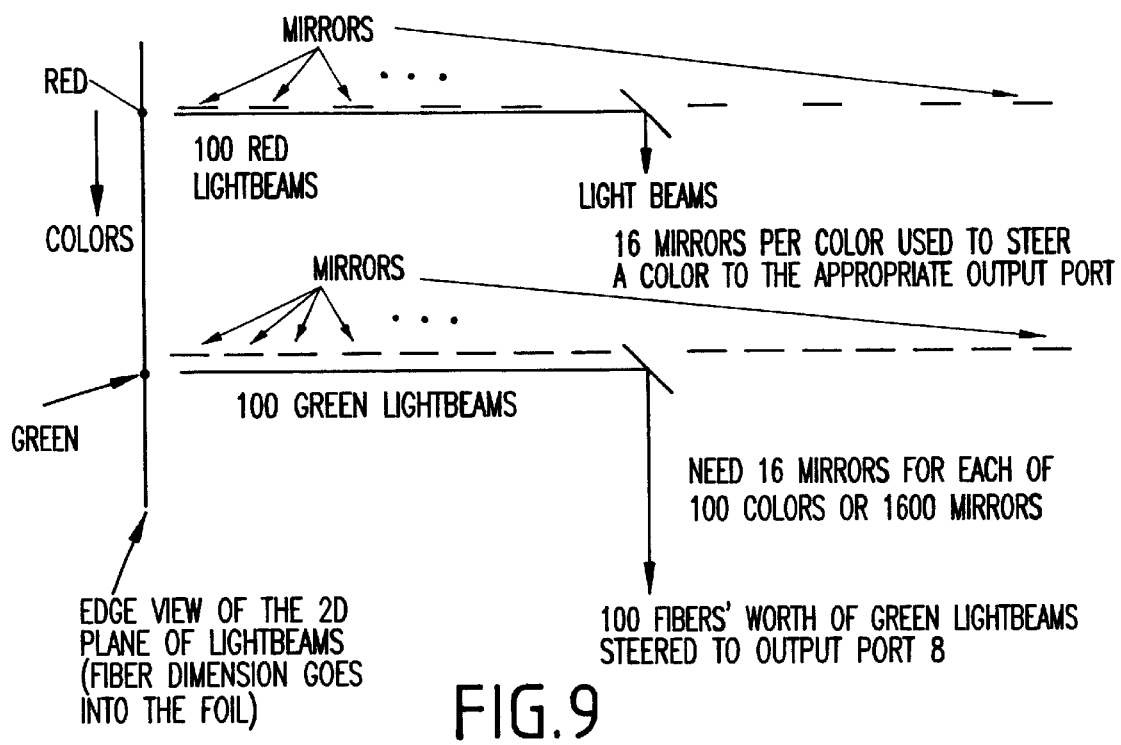
FIG. 9 illustrates another view of the 2-dimensional array of light beams.

This can be accomplished, as shown in FIG. 9 which shows another view of the 2-dimensional array 53A of light beams. In this case, an edge view of the 2-dimensional plane of light beams is shown in which the color dimension goes from the top of the diagram to the bottom and the fiber dimension is perpendicular to the plane of the diagram.

As shown in FIG. 9, mirrors are used to steer the 100 green light beams to the fiber bundle on the appropriate output port. There is one mirror for each of the 16 output ports. Directing the 100 green light beams to the appropriate output port is simply a matter of "flipping" (e.g., rotating) the appropriate mirror. There will be a similar array of 16 mirrors for each of the 100 colors of light. Hence, for example, for the color red, there would be 16 mirrors above those used for the color green and so forth. Thus, in the example above, a total of 1600 mirrors is sufficient to steer all of the light beams in the 2-dimensional array of light beams to the appropriate output ports.

Thus, the process of "splicing" a set of "upstream VCs" to a "downstream VC" as discussed in the ARIS and MPLS references is just a matter of flipping the appropriate mirrors. It is noted that there are no "merging" or "intermingling" problems when the light beams of a given color arrive at an appropriate egress since the light beams from the various ingresses arrive on distinct fibers in the fiber bundle connected to the egress.

Thus, the optical IP switch according to the present invention has many advantages.

For example, there is minimal delay and zero jitter. There are no delays on the path through the switch to buffer data or to convert between optics and electronics. Traffic passes through the switch at the speed of light.

Further, the present invention provides large-capacity communications. For example, consider the case of a 100 node network in which each of the 100 nodes is simultaneously transmitting to each of the other nodes at approximately 40 Gbits/sec. If, as a result of network problems (e.g. power problems, construction workers accidentally cutting a fiber), all the traffic ends up going through a single optical IP switch in Chicago, for example, the total traffic going to that switch would be on the order of:

40 Gbits/sec*100*100=400 Tbits/sec.

Although this is substantially more capacity than can be handled by conventional routers and switches, this does not pose a problem for the optical IP switch of the present invention. The RSC in the Optical IP Switch of the invention would determine the appropriate routes, build the appropriate switched path trees and flip the appropriate mirrors to steer the various components of traffic in the appropriate directions. However, it is noted that 400 Tbits/sec is not the capacity of the optical IP switch. If the traffic sources run 10 times faster or 1000 times faster, the optical IP switch would just handle that much more traffic.

Thus, the optical IP switch of the invention solves a fundamental problem existing since the emergence of the Internet as a communication medium, in that it allows the backbone to run fast enough to handle the aggregated traffic of all the edges of the network no matter how fast the edges are.

Additionally, as mentioned above, the optical IP switch of the invention does not depend on high-speed electronics. Although the optical IP switch can handle very high data rates, it does not require high-speed electronics since there are no electronics on the data path through the switch. Indeed, the inventive optical IP switch does not use electronics to switch or process individual IP packets and the electronics in the optical IP switch do not have to perform any other operations at pico-second rates even though the switch handles very large traffic volumes. Instead, the electronics in the optical IP switch are advantageously used to set up "relatively static", optically switched paths that change only when routing topology changes.

There are many variations of the inventive design described above, as would be evident by one of ordinary skill in the art taking the present specification as a whole.

For example, described above is an optical IP switch that uses 100 fibers in a fiber bundle and 100 wavelengths in an individual fiber (or, more generally, k fibers in a fiber bundle and k wavelengths in a fiber) but other designs are also possible. As described below, there are other designs that require far fewer fibers in a bundle.

That is, instead of k fibers with k wavelengths, the inventive optical IP switch could be tailored to support networks of up to k nodes with single fiber "bundles" that support $k^2$ wavelengths per fiber. For example, a single fiber could be used between optical IP switches with 400 wavelengths per fiber to build a high-speed backbone network of up to 20 nodes. In this case, the 400 wavelengths could be divided into "virtual fibers" and "virtual colors" and these "virtual fibers" and "virtual colors" could be used similarly to the way physical fibers and physical colors are used as described above in the exemplary embodiment of the invention.

For example, the 400 wavelengths could be divided up into groups of 20 such that the i-th block of 20 colors corresponds to the i-th "virtual color" (e.g. the various shades of "blue", from "sky blue" to "deep blue" to "navy blue" might correspond to a single virtual color which could be simply called "blue").

Further, the j-th "virtual fiber" could be defined to consist of the j-th element from each of the 20 blocks of colors (e.g. virtual fiber 3 would include colors, 3, 23, 43, . . . , 383)

Additionally, the i-th "virtual color" could be used for traffic that leaves the network at node i.

Further, the i-th "virtual fiber" could be used for traffic that enters the network at node i. Then the design described above could be used substantially as described (e.g., "as is").

In this case, the inventive optical IP switch would perform the usual tasks of merging the fibers from the input ports, separating the wavelengths in the resulting fiber "bundle", and steering the individual colors to the appropriate output port.

However, in this case, some of the tasks would be a bit simpler than in the exemplary embodiment described above.

In the case of merging, only the single fiber from each input port need be merged into a single merged fiber. In the wavelength separation, only the wavelengths from a single fiber (rather than k fibers) would need to be separated, and only a fairly "coarse" separation of the wavelengths into the "virtual colors" described above, would be needed. Since the various shades of blue correspond to a single "virtual color" and since all of the shades of that "virtual color" are supposed to go to the same node, it is sufficient to separate the wavelengths into the coarse-grained "virtual colors". The steering of colors to appropriate output ports is also simplified since only the coarse-grained "virtual colors" must be dealt with. A 16-port switch would require 16 mirrors to steer one of the "virtual colors" to an appropriate output port and a total of 20*16=320 mirrors to direct all of the "virtual colors" to appropriate output ports.

Additional variations are also possible. For example, 1000 wavelengths could be used on each of the fibers in a 10-fiber bundle in building an optical IP switch according to the invention that could support a high-speed backbone network of up to 100 nodes.

In such a case, the wavelengths could be used as described below.

First, divide the wavelengths in each fiber into blocks of 10. Then, use block i on each fiber for traffic that leaves the network at node i. Thus, there will be a total of 100 wavelengths available (10 wavelengths on each of 10 fibers) for traffic leaving the network at node i.

For traffic entering the network at node j that is going to node i, use the j-th wavelength of the wavelengths available for node i where the j-th wavelength is determined by counting wavelengths starting from block i on fiber 0 and continuing through block i on fiber 1, fiber 2 and so on through block i on fiber 9. Hence, for traffic that enters the network at node j that is going to node i, wavelength w on fiber f is used where f=the integer part of j/10, and w=(i*10)+j % 10 (where j % 10 is the "remainder" when j is divided by 10)

The operation of the switch is as follows. First, the switch merges the fibers from the input ports, merging fiber-0 from each of the input ports into a single merged fiber-0 and doing the same for each of the other fibers from fiber-1 through fiber-9.

Then, the wavelengths in the resulting merged fibers are separated into the "coarse-grained" blocks of 10 wavelengths each as defined above. This results in a 2-dimensional array of light beams where one of the dimensions is fiber number, from 0 to 9, and the other dimension is "coarse-grained color" from 0 to 99.

Mirrors are used to steer the various colors from the merged fibers to the appropriate output ports (after the route protocols and the LDP have determined the proper positions for the various mirrors). As in the first example described above, the switch would have 16 mirrors for each of the 100 colors that need to be switched.

Of course many other designs are possible. For example, in the latter example described above, the 1000 wavelengths could have been divided into blocks of 100 and the i-th block could be used for traffic leaving the network at node i and the i-th wavelength within a block for traffic entering the network at node i.

Additionally, the number of fibers and the number of wavelengths per fiber could be varied so long as the product of these 2 numbers is greater than or equal to $k^2$ where k is the maximum network size that must be supported.

Further, although several of the exemplary designs described above assumed a network of 100 nodes, most backbone networks today have far fewer than 100 nodes and thus the number of fibers and the number of wavelengths in a practical optical IP switch could be smaller than in the examples described above.

Second Embodiment

Figure 10:
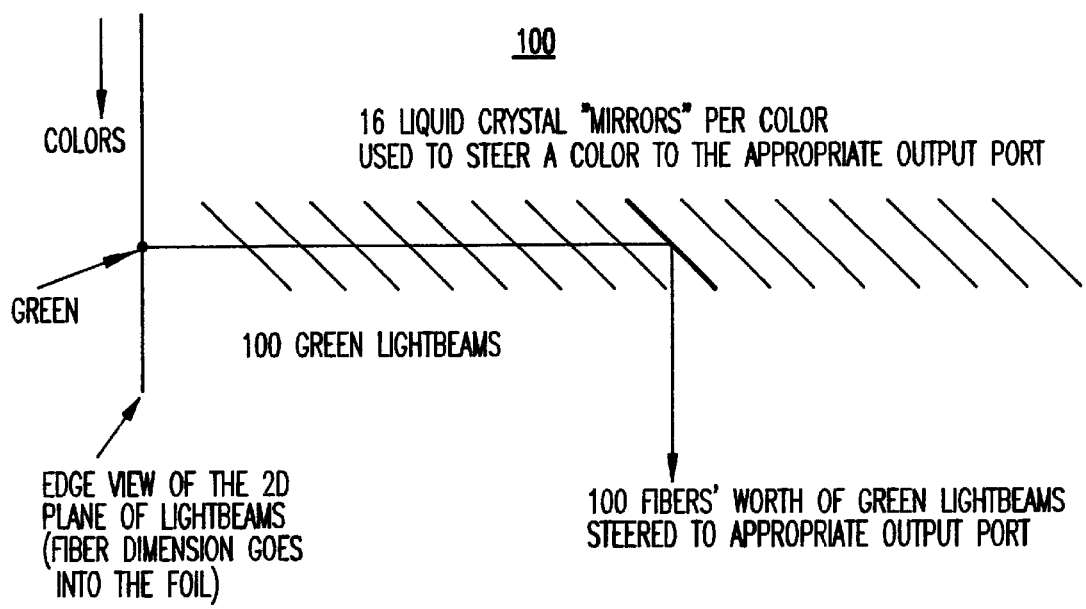
FIG. 10 illustrates light beams being steered in an optical IP switch via non-movable mirrors formed of liquid crystals (LCs)

Turning to FIG. 10, a second embodiment of the present invention will be described.

Specifically, FIG. 10 illustrates a "solid-state" optical IP switch according to the present invention. The optical IP switches described in the first embodiment and the modified exemplary designs described above, use movable mirrors to steer light beams to appropriate output ports. However, the present inventor has discovered that it would be advantageous to provide an optical IP switch that does not rely or contain any moving parts. A significant advantage of eliminating moving parts, as in the second embodiment of the present invention, is that improved reliability will be achieved.

FIG. 10 shows how the light beams can be steered in an optical IP switch 100 via non-movable light steering mechanisms (e.g., mirrors) made out of liquid crystals 101. FIG. 10 is substantially similar to the design of FIG. 9, but the movable mirrors of FIG. 9 have been replaced by liquid crystals (LCs) 101 that are installed in fixed positions. Generally, liquid crystals have two states. In a first state, the LCs are transparent and light passes through them. In a second state, the LCs reflect light. As shown in FIG. 10, a voltage from voltage source 102 can be applied to cause a liquid crystal to change from the transparent state to the reflective state. If the liquid crystals are installed as shown in FIG. 10, then it becomes possible to steer a light beam (or an array of light beams) to a particular output port by applying a voltage to the appropriate liquid crystal.

With the unique and unobvious features of the present invention, an optical IP switching is provided which does not require any electronics in the data pathways. As described above, a number of exemplary designs and modifications can be made for a practical optical IP switch. The optical IP switch can switch IP traffic at rates that are much higher than those of conventional routers and switches since the optical IP switch eliminates the electronics and thus "the electronic bottleneck" on the data path through the switch. Thus, the very high capacity of the optical IP switch will be especially advantageous as Internet traffic continues to grow at its current high exponential rate.

Further, while the optical IP switch uses more wavelengths than conventional routers and switches, the advantages of the invention clearly outweigh this drawback. That is, the inventive device can switch IP packets, literally, at the speed of light.

It is noted that the second embodiment of the present invention could incorporate modifications similar to those described above with regard to the first embodiment.

Figure 11:
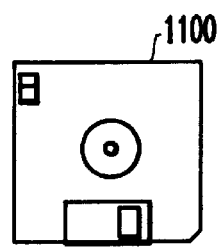
FIG. 11 illustrates a storage medium 1100 for storing steps of the program for the method of routing traffic over a network using the optical switch according to the present invention.

FIG. 11 illustrates a storage medium 1100 for storing steps of the program for the method of routing traffic over a network using the optical switch according to the present invention.

That is, as shown in FIG. 11, in addition to the hardware and process environment described above, a different aspect of the invention includes a computer-implemented method for routing traffic over a network, as described above. As an example, this method may be implemented in the particular hardware environment discussed above.

Further, such a method may be implemented, for example, by operating a CPU, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and the hardware above, to perform the inventive routing of traffic.

This signal-bearing media may include, for example, a RAM (not shown) contained within the CPU, as represented by the fast-access storage for example. Alternatively, the instructions may be contained in another signal-bearing media, such as a magnetic data storage diskette 1100 (FIG. 11), directly or indirectly accessible by the CPU.

Whether contained in the diskette 1100, a computer, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of preferred embodiments, those skilled in the art will recognize that the invention can be practiced with modification within the spirit and scope of the appended claims. For example, instead of a separate input link and an output link being provided with the OIPS of the invention, bidirectional links could be provided.

What is claimed is:

1. An optical switch for a network having a plurality of nodes, comprising:
   a switch coupled to communications links used for input and output in which a plurality of wavelengths are used to carry traffic on a communications link, said switch comprising a light beam steering mechanism for directing said traffic; and
   a controller, coupled to the switch, for controlling the operation of the switch by implementing a routing protocol and exchanging routing information with other nodes, and implementing a labeling protocol that associates a label with a destination, said label comprising at least one of a wavelength and a fiber number,
   wherein the controller controls the switch to direct the various wavelengths of traffic from an input link to an appropriate output link as determined by the routing protocol and the labeling protocol.

2. The optical switch according to claim 1, further comprising:
   a route table for storing destinations therein for routing of said traffic,
   wherein different destinations stored in the route table are associated with different wavelengths of light.

3. The optical switch according to claim 2, wherein said light beam steering mechanism comprises a reflective device for directing traffic from said input link to an appropriate output link.

4. The optical switch according to claim 3, wherein said reflective device comprises a mirror.

5. The optical switch according to claim 3, wherein said switch uses a same wavelength on both said input link and said output link when it directs traffic from an input link to an output link.

6. The optical switch according to claim 2, wherein said switch uses a same wavelength on both said input link and said output link when it directs traffic from an input link to an output link.

7. The optical switch according to claim 1, wherein said light beam steering mechanism directs said traffic from said input link to an appropriate output link.

8. The optical switch according to claim 1, wherein, in said network, routes for a destination form a tree, and
   wherein said switch establishes switched paths to each egress point at which traffic leaves a network of ones of said switch, the switched paths to said egress being used for all destinations that are behind said egress.

9. The optical switch according to claim 8, wherein the switched paths are established from each said egress, by growing a switched path tree which is rooted at the egress.

10. The optical switch according to claim 9, wherein a selected path tree uses a single wavelength that is passed upwards from a root as branches are added to the selected path tree.

11. The optical switch according to claim 10, wherein different shades of a same wavelength are employed at a merge point of light beams of said traffic.

12. The optical switch according to claim 10, wherein a plurality of switches exist in said network, and
   wherein multi-fiber bundles are used on links between optical switches employed in said network such that the same wavelengths from different sources are carried on different fibers in a bundle.

13. The optical switch according to claim 10, further comprising:
   a plurality of optical ports connectable to said switch, each port connecting to a plurality of bundles of optical fibers, wherein a port receives traffic on a first of said fiber bundles and transmits on a second of said fiber bundles,
   each fiber bundle containing one optical fiber or a plurality of optical fibers, each for carrying a plurality of said wavelengths of light.

14. The optical switch according to claim 13, wherein a group of said wavelengths is associated with said egress point.

15. The optical switch according to claim 13, wherein said light beam steering mechanism steers blocks of predetermined numbers of wavelengths to selected output ports.

16. The optical switch according to claim 1, wherein said data path through the switch is devoid of electronic components.

17. The optical switch according to claim 1, wherein said light beam steering mechanism comprises a non-movable mirror formed of a liquid crystal.

18. The optical switch according to claim 17, wherein said switch further comprises a voltage source for applying a voltage to said liquid crystal to change a transparent state of said liquid crystal to a reflective state, thereby steering a light beam to a particular output port by applying a voltage to a selected liquid crystal.

19. The optical switch according to claim 1, wherein said network comprises one of the Internet, a local area network (LAN), a wide area network (WAN), and a point-to-point link between two systems.

20. The optical switch according to claim 1, wherein said labeling protocol comprises one of multiprotocol label switching (MPLS), aggregate route-based Internet switching (ARIS), and tag switching.

21. The optical switch according to claim 1, wherein said traffic comprises a plurality of data packets, said data packet being labeled by one of a wavelength and a fiber number on which said data packet is carried.

22. The optical switch according to claim 1, wherein said traffic comprises data packet traffic, and wherein said optical switch is devoid of electronic processing of said data packet traffic.

23. An optical switch for a network having a plurality of nodes, comprising:
- a switch coupled to communications links used for input and output in which a plurality of wavelengths are used to carry traffic on a communications link; and
- a controller, coupled to the switch, for controlling the operation of the switch by implementing a routing protocol, and implementing a label distribution protocol that associates a label with a destination, said label comprising at least one of a wavelength and a fiber number,
- wherein the controller controls the switch to direct the various wavelengths of traffic from an input link to an appropriate output link as determined by the routing protocol and the label distribution protocol,
- wherein, in said network, routes for a destination form a tree,
- wherein said switch establishes switched paths to each egress point at which traffic leaves a network of ones of said switch, the switch paths to said egress being used for all destinations that are behind said egress,
- wherein the switched paths are established from each said egress, by growing a switched path tree which is rooted at the egress
- wherein a selected path tree uses a single wavelength that is passed upwards from a root as branches are added to the selected path tree
- wherein said optical switch further comprises:
  - a plurality of optical ports connectable to said switch, each port connecting to a plurality of bundles of optical fibers, wherein a port receives traffic on a first of said fiber bundles and transmits on a second of said fiber bundles,
  - wherein each fiber bundle contains one optical fiber or a plurality of optical fibers, each for carrying a plurality of said wavelengths of light, and
  - wherein, in a network of ones of said switch, a wavelength is associated with each egress and a selected fiber number is associated with each ingress point.

24. The optical switch according to claim 23, wherein a unique number is assigned to each node and the i-th color will be used for traffic that leaves the network at node i and the i-th fiber for traffic that enters the network at node i.

25. The optical switch according to claim 24, wherein a fiber i is only used for traffic originating at a node i and node i's traffic arrives at any node j on a single port, to avoid a merging problem on fiber i.

26. The optical switch according to claim 23, wherein said switch includes a wavelength separator for separating wavelengths in the fibers of the bundle, thereby to produce a two-dimensional array of light beams in which a first dimension corresponds to color and a second dimension corresponds to fiber number.

27. The optical switch according to claim 26, wherein said switch further comprises a plurality of mirrors for reflecting said light beams.

28. The optical switch according to claim 27, wherein a predetermined color corresponds to a predetermined egress and all the predetermined color light beams are arranged in a column, such that said mirror steers the column of predetermined color light beams to a selected output port.

29. An optical switch for a network having a plurality of nodes, comprising:
- a switch coupled to communications links used for input and output in which a plurality of wavelengths are used to carry traffic on a communications link; and
- a controller, coupled to the switch, for controlling the operation of the switch by implementing a routing protocol, and implementing a label distribution protocol that associates a label with a destination, said label comprising at least one of a wavelength and a fiber number,
- wherein the controller controls the switch to direct the various wavelengths of traffic from an input link to an appropriate output link as determined by the routing protocol and the label distribution protocol,
- wherein, in said network, routes for a destination form a tree,
- wherein said switch establishes switched paths to each egress point at which traffic leaves a network of ones of said switch, the switched paths to said egress being used for all destinations that are behind said egress,
- wherein the switched paths are established from each said egress, by growing a switched path tree which is rooted at the egress
- wherein a selected path tree uses a single wavelength that is passed upwards from a root as branches are added to the selected path tree
- wherein said optical switch further comprises a plurality of optical ports connectable to said switch, each port connecting to a plurality of bundles of optical fibers, wherein a port receives traffic on a first of said fiber bundles and transmits on a second of said fiber bundles,
- wherein each fiber bundle contains one optical fiber or a plurality of optical fibers, each for carrying a plurality of said wavelengths of light,
- wherein said switch further comprises a light steering mechanism, and
- wherein, with said fiber bundle including a plurality of optical fibers, said switch merges the fibers from the input ports, such that a fiber-0 is merged from each of the input ports into a single merged fiber-0 and doing the same for each of the other plurality of fibers.

30. The optical switch according to claim 29, wherein said light steering mechanism steers individual wavelengths of said plurality of wavelengths to selected output ports.

31. The optical switch according to claim 29, wherein said light steering mechanism steers blocks of predetermined numbers of wavelengths to selected output ports.

32. The optical switch according to claim 29, wherein wavelengths in resulting merged fibers are separated into blocks of a predetermined number of wavelengths, to form a two-dimensional array of light beams where a first dimension comprises a fiber number and a second dimension corresponds to a block of wavelengths.

33. An optical switch for a network having a plurality of nodes, comprising:
- a switch coupled to communication links used for input and output in which a plurality of wavelengths are used to carry traffic on a communications link, said switch comprising a light beam steering mechanism for directing said traffic; and a controller, coupled to said switch, for controlling an operation of said switch by implementing a routing protocol and exchanging routing information with other nodes, implementing a network protocol and forwarding said traffic to a next hop, and implementing a labeling protocol that associates a label with a destination, said label comprising at least one of a wavelength and a fiber number, the controller controlling said switch such that said switch uses said wavelengths of said link to route said traffic between said nodes of said network.

34. A network, comprising:

a plurality of nodes for communicating with one another; and a plurality of optical switches for routing traffic between said nodes, each of said optical switches comprising:

a switch coupled to communications links used for input and output in which a plurality of wavelengths are used to carry traffic on a communications link, said switch comprising a light beam steering mechanism for directing said traffic; and a controller, coupled to the switch, for controlling an operation of the switch by implementing a routing protocol and exchanging routing information with other nodes, and implementing a labeling protocol that associates a label with a destination, said label comprising at least one of a wavelength and a fiber number, the controller controlling said switch to direct various wavelengths of traffic from an input link to an appropriate output link as determined by the routing protocol and the labeling protocol.

35. A network, comprising:

a plurality of nodes for communicating with one another; and a plurality of optical switches for routing traffic between said nodes, each of said optical switches comprising:

a switch coupled to communications links used for input and output in which a plurality of wavelengths are used to carry traffic on a communications link, said switch comprising a light beam steering mechanism for directing said traffic; and a controller, coupled to said switch, for controlling an operation of said switch by implementing a routing protocol and exchanging routing information with other nodes, implementing a network protocol and forwarding said traffic to a next hop, and implementing a labeling protocol that associates a label with a destination, said label comprising at least one of a wavelength and a fiber number, the controller controlling said switch such that said switch uses said wavelengths of said link to route said traffic between said nodes of said network.

36. A method of communicating over a network having a plurality of nodes, comprising:

coupling a switch to communications links used for input and output in which a plurality of wavelengths are used to carry traffic on a communications link, said switch comprising a light beam steering mechanism for directing said traffic; and controlling an operation of the switch by implementing a routing protocol and exchanging routing information with other nodes, and implementing a labeling protocol that associates a label with a destination, said label comprising at least one of a wavelength and a fiber number, said controlling including directing various wavelengths of traffic from an input link to an appropriate output link as determined by the routing protocol and the labeling protocol.

37. A method of communicating over a network having a plurality of nodes, comprising:

coupling a switch to communications links used for input and output in which a plurality of wavelengths are used to carry traffic on a communications link, said switch comprising a light beam steering mechanism for directing said traffic; and controlling an operation of said switch by implementing a routing protocol and exchanging routing information with other nodes, implementing a network protocol and forwarding said traffic to a next hop, and implementing a labeling protocol that associates a label with a destination, said label comprising at least one of a wavelength and a fiber number; and using said wavelengths on said link to route said traffic between said nodes of said network.

38. A signal-bearing medium tangibly embodying a program of machine-readable instructions executable by a digital processing apparatus to perform a method of routing traffic over a network having a plurality of nodes, said method comprising:

causing a switch to be coupled to communications links used for input and output in which a plurality of wavelengths are used to carry traffic on a communications link, said switch comprising a light beam steering mechanism for directing said traffic; and controlling the operation of said switch by implementing a routing protocol and exchanging routing information with other nodes, and implementing a labeling protocol that associates a label with a destination, said label comprising at least one of a wavelength and a fiber number, said controlling including directing the various wavelengths of traffic from an input link to an appropriate output link as determined by the routing protocol and the labeling protocol.

39. A signal-bearing medium tangibly embodying a program of machine-readable instructions executable by a digital processing apparatus to perform a method of routing traffic over a network having a plurality of nodes, said method comprising:

causing a switch to be coupled to communications links used for input and output in which a plurality of wavelengths are used to carry traffic on a communications link, said switch comprising a light beam steering mechanism for directing said traffic; and controlling an operation of said switch by implementing a routing protocol and exchanging routing information with other nodes, implementing a network protocol and forwarding said traffic to a next hop, and implementing a labeling a protocol that associates a label with a destination, said label comprising at least one of a wavelength and a fiber number; and using said wavelengths of said link to route said traffic between said nodes of said network.

* * * * *

(12) EX PARTE REEXAMINATION CERTIFICATE (7605th)
United States Patent
Boivie

(10) Number: US 6,577,418 C1
(45) Certificate Issued: Jul. 13, 2010

(54) OPTICAL INTERNET PROTOCOL SWITCH AND METHOD THEREFOR

(76) Inventor: Richard Harold Boivie, 194 Cutlers Farm Rd., Monroe, CT (US) 06468

Reexamination Request:
No. 90/010,696, Sep. 24, 2009

Reexamination Certificate for:
Patent No.: 6,577,418
Issued: Jun. 10, 2003
Appl. No.: 09/433,239
Filed: Nov. 4, 1999

(51) Int. Cl.
*H04Q 11/00* (2006.01)
*H04L 12/56* (2006.01)

(52) U.S. Cl. .................................................. 398/48
(58) Field of Classification Search ................. None
See application file for complete search history.

(56) References Cited

U.S. PATENT DOCUMENTS 5,265,092 A  11/1993  Soloway et al.

FOREIGN PATENT DOCUMENTS

| EP | 0518595 A2 | 12/1992 |
|---|---|---|
| EP | 0552385 A2 | 7/1993 |
| EP | 0608653 A1 | 8/1994 |
| EP | 0684716 A1 | 11/1995 |
| EP | 0740442 A2 | 10/1996 |
| EP | 0773652 A2 | 5/1997 |
| EP | 0781010 A2 | 6/1997 |

OTHER PUBLICATIONS

"Multi–Protocol Lambda Switching: Combining MPLS Traffic Engineering Control With Optical Crossconnects", Daniel O. Awduche, et al. (hereinafter "Awduche"), Internet Engineering Task Force (Internet Draft), dated Oct. 1999, http://tools.ietf.org/id/draft–awduche–mpls–te–optical–00.txt.*
IBM Technical Report, Aggregate Route–based IP Switching (ARIS), N. Feldman, et al., TR 29.2353, (Feb. 1998).

* cited by examiner

*Primary Examiner*—Christina Y Leung

(57) ABSTRACT

An optical switch for a network having a plurality of nodes, includes a switch coupled to communications links used for input and output in which a plurality of wavelengths are used to carry traffic on a communicatons link, and a controller, coupled to the switch, for controlling the operation of the switch by implementing a routing protocol, and implementing a labeling protocol to associate a wavelength with a route table destination. The controller controls the switch to direct the various wavelengths of traffic from an input link to an appropriate output link as determined by the routing protocol and the labeling protocol.

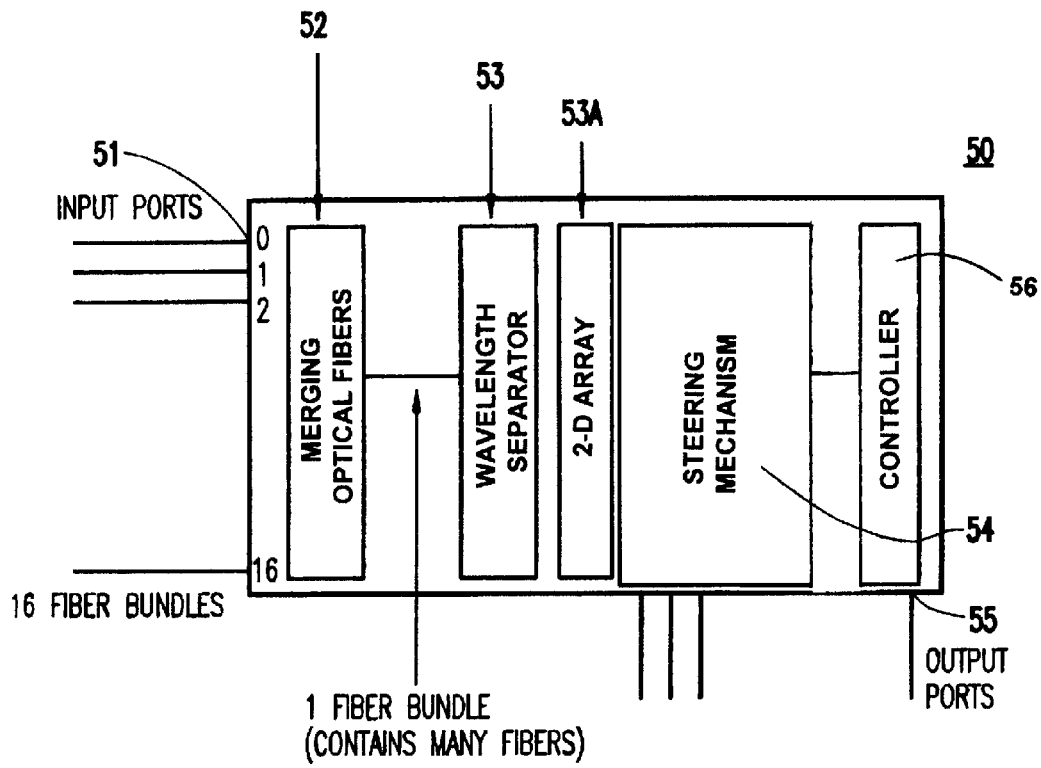

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 33-39 is confirmed.

Claims 2-32 were not reexamined.

\* \* \* \* \*